(12) United States Patent
Battle et al.

(10) Patent No.: US 11,403,109 B2
(45) Date of Patent: Aug. 2, 2022

(54) STEERING A HISTORY BUFFER ENTRY TO A SPECIFIC RECOVERY PORT DURING SPECULATIVE FLUSH RECOVERY LOOKUP IN A PROCESSOR

(71) Applicant: International Business Machines Corporation, Armonk, NY (US)

(72) Inventors: Steven J. Battle, Austin, TX (US); Khandker Nabil Adeeb, Travis, TX (US); Brian D. Barrick, Pflugerville, TX (US); Joshua W. Bowman, Austin, TX (US); Susan E. Eisen, Round Rock, TX (US); Brandon Goddard, Kirkland, WA (US); Jamory Hawkins, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 16/210,377

(22) Filed: Dec. 5, 2018

(65) Prior Publication Data
US 2020/0183701 A1      Jun. 11, 2020

(51) Int. Cl.
*G06F 9/38*       (2018.01)
*G06F 9/30*       (2018.01)

(52) U.S. Cl.
CPC ........ *G06F 9/3863* (2013.01); *G06F 9/30116* (2013.01)

(58) Field of Classification Search
CPC ........................... G06F 9/30116; G06F 9/3863
See application file for complete search history.

(56) References Cited

U.S. PATENT DOCUMENTS

| | | | |
|---|---|---|---|
| 7,055,020 B2 | 5/2006 | Gold et al. | |
| 2003/0163763 A1* | 8/2003 | DeLano | G06F 11/1405 714/15 |
| 2007/0239970 A1* | 10/2007 | Liao | G06F 9/3012 712/225 |
| 2008/0195850 A1* | 8/2008 | Abernathy | G06F 9/3802 712/240 |
| 2011/0238962 A1* | 9/2011 | Cain, III | G06F 9/384 712/228 |

OTHER PUBLICATIONS

Perais, A. et al., Cost Effective Physical Register Sharing, International Symposium on High Performance Computer Architecture, Mar. 2016, 14 pages.
Disclosed Anonymously, Speculative Restore of History Buffer in a Microprocessor, Jul. 5, 2017, 6 pages.

* cited by examiner

*Primary Examiner* — David J. Huisman
(74) *Attorney, Agent, or Firm* — Scully, Scott, Murphy & Presser, P.C.

(57) ABSTRACT

A computer system, processor, and method for processing information is disclosed that includes reading out a plurality of entries in a history buffer prior to initiating a flush recovery process; initiating the flush recovery process; determining which of the history buffer entries read out of the history buffer should be recovered; and sending information associated with the history buffer entries to be recovered to one or more history buffer recovery ports. In one or more embodiments, the history buffer entries are continually read out in response to a processor and history buffer entries read out from the history buffer are directed to a specific history buffer recovery port associated with a mapper of a specific logical register.

17 Claims, 7 Drawing Sheets

STEERING A HISTORY BUFFER ENTRY TO A SPECIFIC RECOVERY PORT DURING SPECULATIVE FLUSH RECOVERY LOOKUP IN A PROCESSOR

BACKGROUND OF INVENTION

The present invention generally relates to information handling and data processing systems, processors, and more specifically to recovering and restoring logical registers after a flush operation.

Modern information and data handling systems and processors often execute instructions out of order to achieve greater processing efficiency. Processors, to handle executing out-of-order instructions, typically are "pipelined" and have multiple elements that operate in parallel to process multiple instructions in a single processing cycle. Pipelining involves processing instructions in stages, so that the pipelined stages may process a number of instructions concurrently. To improve throughput processors may include multiple pipelines or execution slices within each processor core. Multiple execution slices may be used as part of simultaneous multi-threading (SMT) within a processor core.

Typically a processor pipeline may refer to a set of data processing circuitry or hardware units connected in series within a processor. The processor pipeline usually includes a number of stages, and may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually registers and queues associated with the execution units and/or the issue queue (ISQ) to hold data, information and/or instructions for the execution units.

Out-of-order processors execute instructions as soon as their operands are available (and valid), independent of the original instruction sequence. Consequently, as these processors execute out-of-order instructions, they generate numerous temporary register results. The temporary values are stored together with completed values in register files. The temporary values become complete or permanent values when the corresponding instructions are complete.

Executing instructions out of order creates additional complexity in handling and processing instructions. Depending upon how the instructions are handled in out-of-order processors, processor latency and inefficiency may result. In out-of-order processors, an instruction can change a register value before all of the prior instructions complete. If any of the prior instructions cause an exception or interruption, then all of the sequential instructions prior to the time of the exception, e.g., an interruptible instruction, will need to be flushed. As a result, the registers allocated to the instruction being flushed will also need to be flushed.

One of the complexities in handling and processing out-of-order instructions is restoring the processor state in the event of an interruptible instruction, e.g., a mispredicted branch instruction. In this regard, registers will need to be flushed and restored to the state they were in before the exception, e.g., interruptible instruction. Flushing and recovering the contents of the logical registers can introduce latency and delay to a processor.

SUMMARY

The summary of the disclosure is given to aid understanding of a computer system, computer architectural structure, processor, and method of restoring logical registers in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

Certain aspects of the present disclosure provide a method, and in an example, a method of processing data in a processor that includes reading out a plurality of entries in a history buffer prior to initiating a flush recovery process; initiating the flush recovery process; determining which of the history buffer entries read out of the history buffer should be recovered; and sending information associated with the history buffer entries to be recovered to one or more history buffer recovery ports. In an aspect the history buffer entries are continually read out in response to the processor processing data. In one or more embodiments, the method further includes directing history buffer entries read out from a history buffer to a specific history buffer recovery port associated with the logical register, where in an aspect one or more multiplexors are used to direct history buffer entries to the specific history buffer recovery port, and in a further aspect each recovery port of the history buffer is associated with a mapper of a specific logical register.

A computer system for processing data is also disclosed where in an embodiment, the computer system includes at least one computer processor for processing instructions, the at least one processor having: a physical register file having a plurality of entries to store the data; a logical register mapper configured to map each of a plurality of logical registers to one of the plurality of entries in the physical register file; and a history buffer associated with the logical register mapper and having a plurality of recovery ports and a plurality of history buffer entries, each history buffer entry for storing information on a logical register evicted from the logical register mapper, wherein the information includes a bit field to identify an evicted logical register corresponding to that history buffer entry and an evicted instruction identifier (evictor itag) of an instruction that evicted the evicted logical register from the logical register mapper. The processor in one or more embodiments is configured to initiate a flush-recovery process that includes sending a flush instruction identifier (flush itag) to the history buffer; and the history buffer is configured to: (a) read out the plurality of history buffer entries prior to receiving the flush itag; (b) determine which of the plurality of history buffer entries read out of the history buffer should be recovered; and (c) for each history buffer entry to be recovered, send information associated with that history buffer entry to be recovered to one of the plurality of history buffer recovery ports. In an aspect, the processor is configured to continually read out history buffer entries from the history buffer in response to the processor processing instructions, and the processor is further configured to direct history buffer entries read out from the history buffer to a specific history buffer recovery port associated with at least one specific logical register.

In a further aspect, a computer system for processing information is disclosed where the computer system includes at least one computer processor for processing instructions, the at least one processor having one or more physical register files, each physical register file having a plurality of physical register entries to store data associated with processor instructions; one or more logical register mappers configured to map each of a plurality of logical registers to at least one of the plurality of physical register file entries in the one more physical register files; and a history buffer having a plurality of history buffer entries, each history buffer entry for storing information evicted from one of the plurality of logical registers, and a plurality of recovery ports associated with the one or more logical register mappers. In an embodiment, the at least one processor is configured to initiate a flush-recovery process where the history buffer is configured to: (a) read out the plurality of history buffer entries prior to initiating a flush-recovery process; (b) determine which of the plurality of history buffer entries read out of the history buffer should be cleared; and (c) for each history buffer to be recovered, send information associated with the history buffer to one of the plurality of history buffer recovery ports. The at least one processor is configured to clear each history buffer entry read out from the history buffer that is determined to be cleared.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of the information handling system, computer system, computer architectural structure, processor, history buffers, mappers, logical registers, and their method of operation will be better understood when read in conjunction with the figures provided. Embodiments are provided in the figures for the purpose of illustrating aspects, features and/or various embodiments of the computer system, computer architectural structure, processor, history buffers, e.g, Save & Restore Buffers (SRB), logical registers, mappers and their method of operation, but the claims should not be limited to the precise arrangement, structures, features, aspects, embodiments or devices shown, and the arrangements, structures, subassemblies, features, aspects, methods, processes, embodiments, and devices shown may be used singularly or in combination with other arrangements, structures, subassemblies, features, aspects, processes, methods, embodiments, and devices.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, history buffers, e.g., SRBs, logical registers, mappers, and their method of operation, however, it will be understood by those skilled in the art that different and numerous embodiments of the computer system, computer architectural structure, processor, history buffer, logical registers, mappers and their method of operation may be practiced without those specific details, and the claims and invention should not be limited to the embodiments, subassemblies, features, processes, methods, aspects, features, or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of history buffers to restore the contents of logical registers. It may be noted that a numbered element is numbered according to the figure in which the element is introduced, and is typically referred to by that number in succeeding figures.

Figure 1:
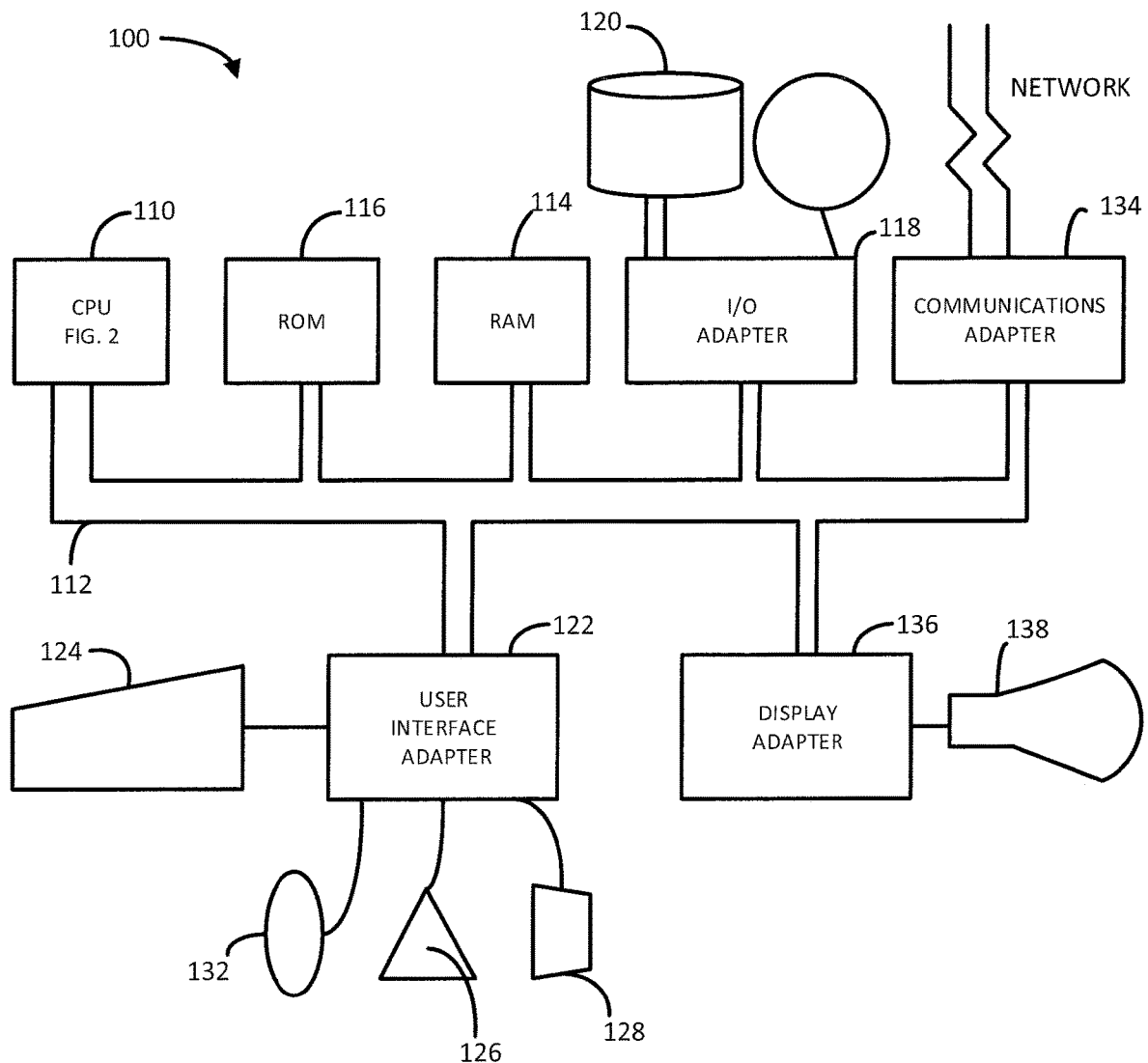
FIG. 1 illustrates an example of a data processing or information handling system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. Processor 110 may have a bus interface unit coupled to the bus 112 for controlling transfers of data and instructions between memory, such as random access memory 114, and caches, e.g. instruction cache (I-Cache) and data cache (D-Cache).

Data cache and instruction cache may each have various levels of cache, such as, for example, L1 cache, L2 cache, and/or L3 cache.

I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132, or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various logic units, functional units, registers, queues, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
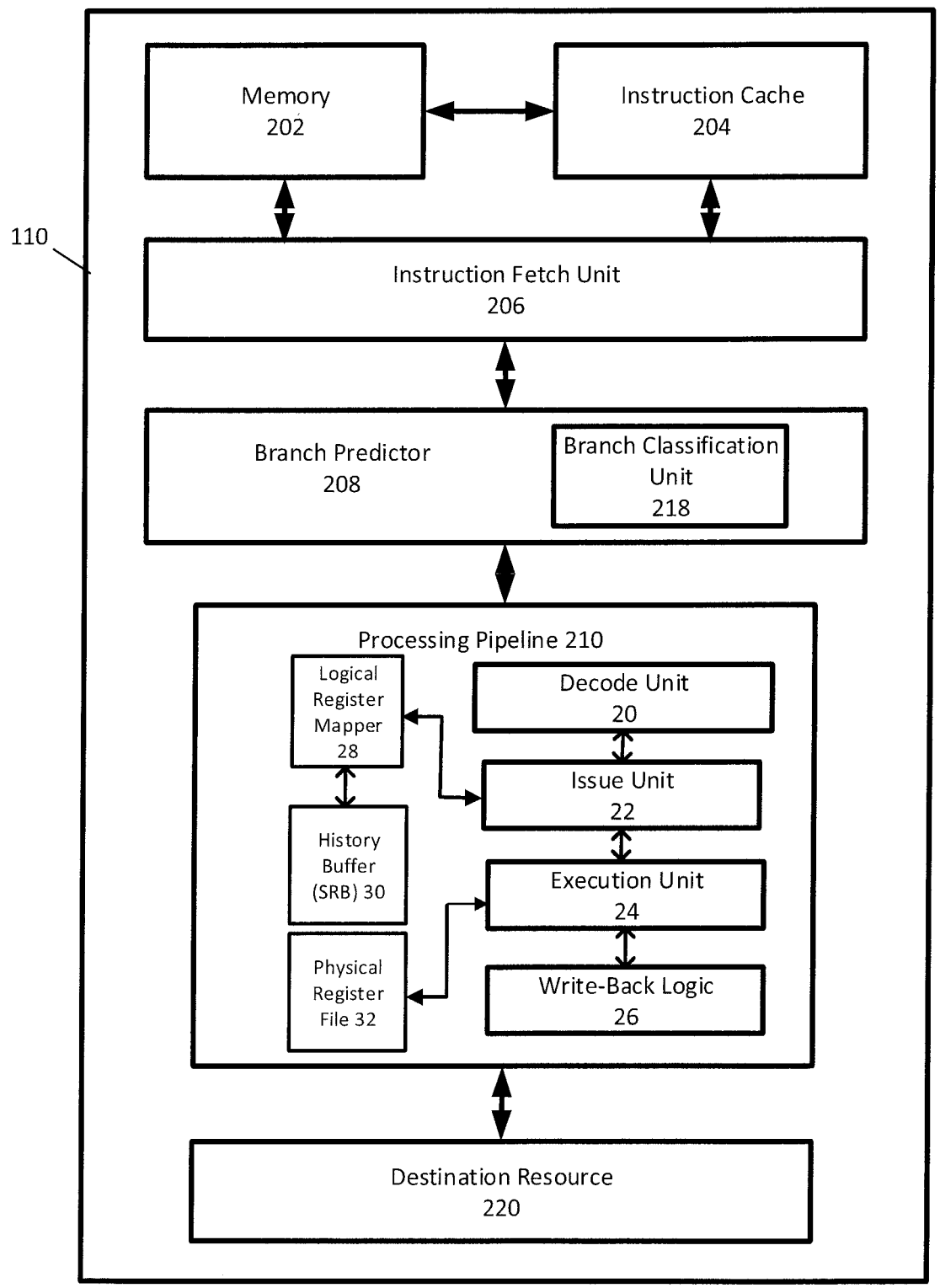
FIG. 2 illustrates a block diagram of a processor in which certain aspects of the present disclosure may be practiced.

FIG. 2 depicts a block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units, vector scaler execution units, and/or other execution units. The logical register mapper 28 contains entries which provide a mapping between a logical register entry (LReg) and an entry in the physical register file 32. When an instruction wants to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer stores information from the logical register mapper 28 when a new instruction evicts data in case the new instruction is flushed and the old data needs to be recovered. The history buffer (SRB) 30 keeps the stored information until the new instruction completes. History buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

In certain aspects, a CPU 110 may have multiple execution/processing slices with each slice having one or more of the units shown in FIG. 2. For example, each processing slice may have its own processing pipeline 210 with functional/execution units 24. A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. In an example, each processing slice may be an independent processor (e.g., processor 110) and may execute instructions independently of other processing slices in the multi-slice processor, so that multiple threads may be simultaneously executed by the multi-slice processor. Simultaneous processing in multiple slices may considerably increase processing speed of the multi-slice processor. In single-thread (ST) mode a single thread is processed, and in SMT mode, in one or more embodiments, two threads (SMT2) or four threads (SMT4) are simultaneously processed.

Figure 3:
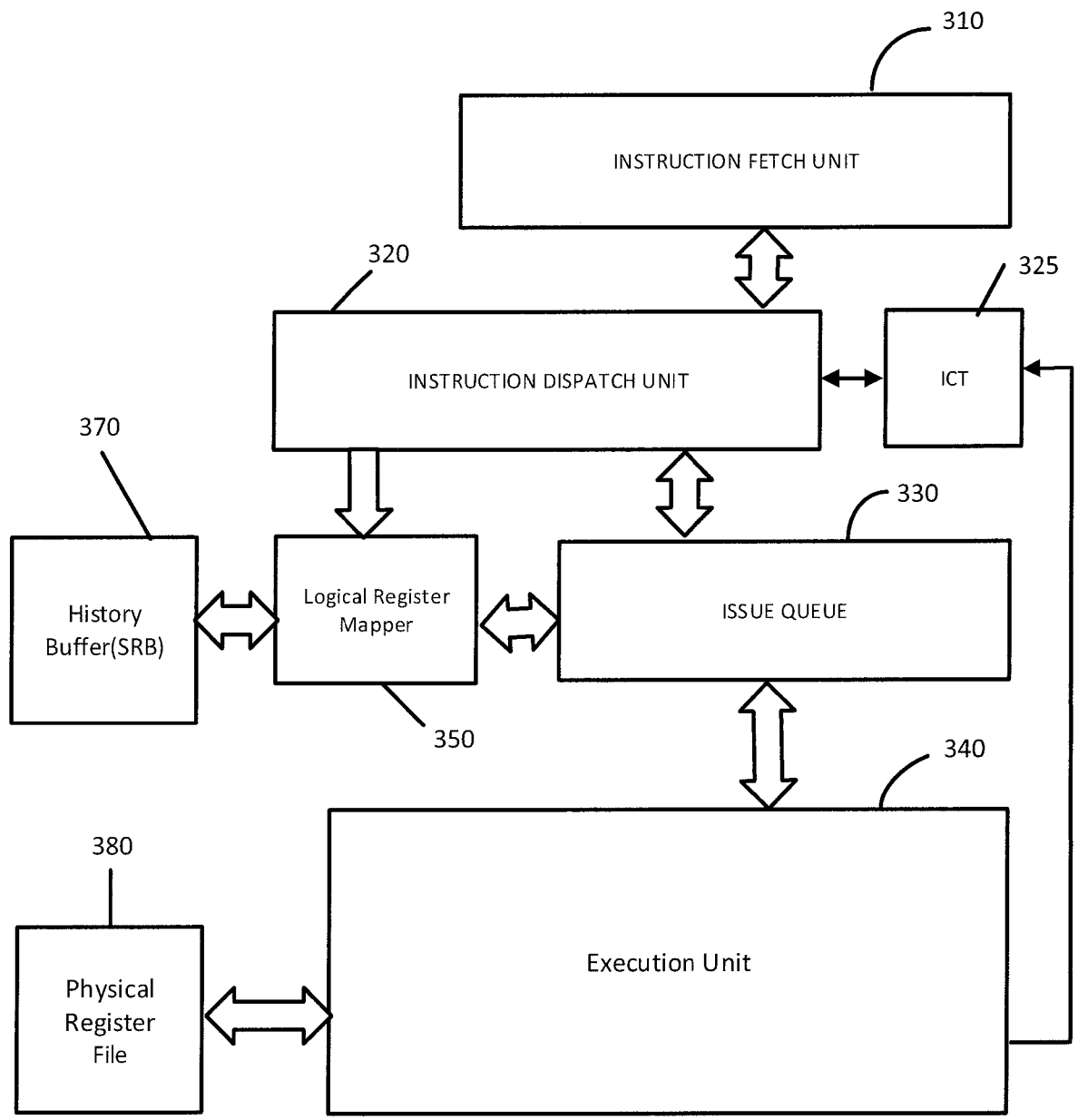
FIG. 3 illustrates a block diagram of a multi-slice processor in accordance with an aspect of the disclosure in which certain aspects of the present disclosure may be practiced.

FIG. 3 illustrates a block diagram of a portion of a processor 110. The pipeline 300 in the processor 110 in FIG. 3 includes Instruction Fetch Unit 310, Instruction Dispatch Unit 320, Issue Queue (ISQ) 330, Instruction Completion Table (ICT) 325, Execution Unit 340, Logical Register Mapper 350, history buffer (SRB) 370, and Physical Register File 380. The Execution Unit 340 may include one or more queues to hold instructions for execution by the Execution Unit 340.

The Instruction Fetch Unit 310 fetches instructions to be executed by the processor 110 or processor slice and sends them to the Instruction Dispatch Unit 320. The Instruction Dispatch Unit 320 dispatches instructions to the Issue Queue (ISQ) 330, typically in program order. The Issue Queue (ISQ) 330 will issue instructions to the Execution Unit 340. The ISQ 330 typically holds an instruction until data associated with the instruction has been retrieved and ready for use. A physical register file 380 may serve to store data to be used in an operation specified in an instruction dispatched to an execution unit 340, and the result of the operation performed by the Execution Units 340 may be written to the designated target register entry in the physical register file 380.

When data is not ready, e.g., not within the appropriate data cache or register, delay can result as the ISQ 330 will not issue the instruction to the Execution Unit 340. For at least this reason, the Issue Queue (ISQ) typically issues instructions to the Execution Units 340 out of order so instructions where the required data is available can be executed. Dispatch Unit 320 will stamp each instruction dispatched to the Issue Queue 330 with an identifier, e.g., identification tag (itag), to identify the instruction. The Dispatch Unit 320 may stamp instructions with other information and meta data. The instructions are allocated (assigned) and stamped in ascending program order on a per thread basis by the Dispatch Unit 320. Dispatch Unit 320 may also maintain a per thread instruction counter that increments for each instruction in a thread that is dispatched to the Issue Queue 330.

The Execution Unit 340 executes instructions out of order and when the Execution Unit 340 finishes an instruction, the Execution Unit 340 will send the finished instruction, e.g., itag, to the ICT 325. The ICT 325 contains a queue of the instructions dispatched by the Dispatch Unit 320 and tracks the progress of the instructions as they are processed. In an embodiment, the ICT 325 has a completion tail pointer that keeps track of the progress of executing instructions in the thread, e.g., points to the next to complete instruction. The instruction entry in the ICT will not identify the instruction as complete until all older instructions in the thread are completed.

There are circumstances when the instructions and corresponding entries in the logical register mapper 350 and the history buffer (save and restore buffer (SRB)) 370 in the pipeline will need to be flushed. For example, where an interruptible instruction, e.g., branch mispredict, occurs, the information in the logical registers will need to be flushed and restored. The processor may include a history buffer, e.g., Save & Restore Buffer (SRB) 370, to save a processor state before, for example, an interruptible instruction, so that if an interrupt occurs, control logic may recover the processor state to the interrupt point by restoring the content of registers, memory cache, and main memory.

Figure 7:
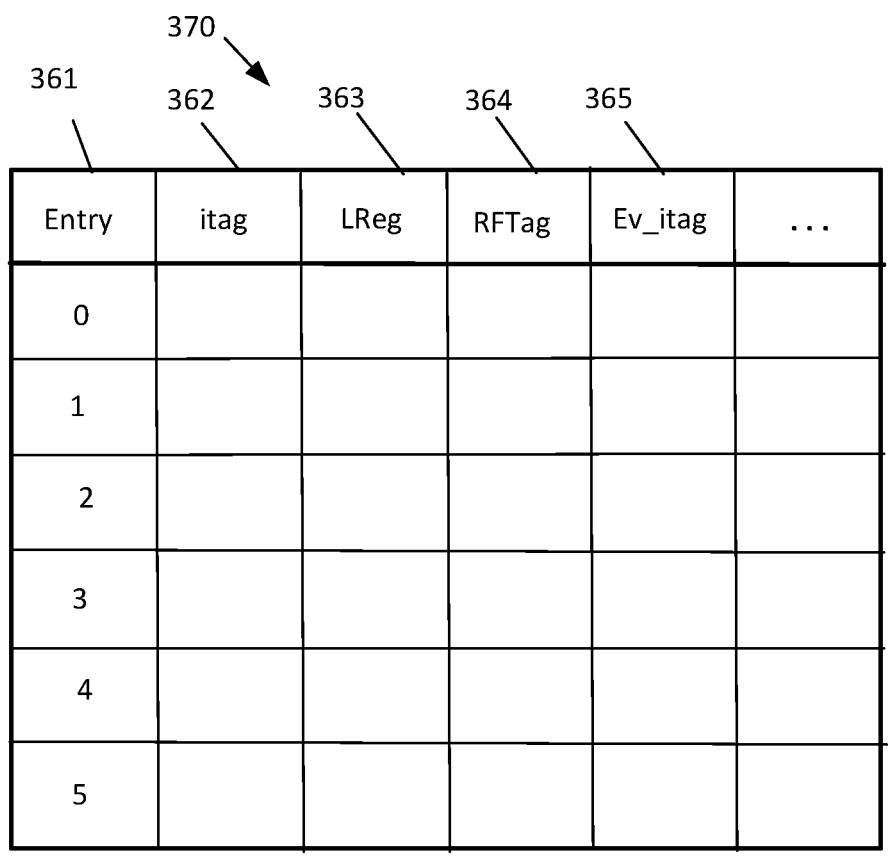
FIG. 7 illustrates a block diagram illustrating a history buffer including the fields of information for entries in the history buffer according to an embodiment of the present disclosure.

In operation, when a new instruction with an instruction tag (itag) produces a value to be stored in a logical register "x" after it is executed, the prior value in logical register "x" is evicted from logical register "x", and the data and information associated with the instruction is stored in the history buffer (SRB) 370. That is, history buffer (SRB) 370 contains logical register entries the logical register mapper 350 evicted from the logical register mapper 350 by younger instructions. The information stored in the history buffer (SRB) 370 may include the itag of the instruction that evicted the logical register entry (i.e., the evictor itag) from the logical register. History buffer (SRB) 370, in an embodiment, stores itag, logical register entry number (the bit field that identifies the logical register entry (LReg)), and Register File tag (RFTag) information. The RFTag is a pointer that correlates an entry in a logical register to an entry in the Physical Register File 380. History buffer (SRB) 370 may store and track other information. Each slice of history buffer (SRB) 370 has an interface to the logical register mapper 350 to recover the itag, and register file tag (RFTag) (and other meta data) for each evicted logical register entry (LReg). The information is kept in the history buffer (SRB) 370 in a history buffer (SRB) entry until the new instruction (evictor instruction) is completed. At which point there is no reason to keep the old entry in the history buffer, e.g., SRB 370, and the entry is removed from the history buffer, as there is no flush recovery that could cause the history buffer (SRB) entry to be recovered. FIG. 7 is a block diagram of an example of history buffer (SRB) 370 illustrating a plurality of entries 361 where each entry 361 includes an itag field 362 containing itag data, an LReg field 363 containing LReg data, an RFTag field 364 containing data correlating the LReg entry to a physical register file entry, and a Ev_itag field 365 containing information on the instruction that evicted the instruction which is the subject of that history buffer entry 361 from the logical register. That is, there is an instruction that removes or evicts a logical register from the logical register mapper 350, and information on the instruction that removes or evicts that entry from the logical register mapper 350 (e.g., Ev_Tag) is stored in the SRB 370. The block diagram of the history buffer (SRB) 370 also includes other information to be stored and/or included with each history buffer entry 361.

Logical register mapper 350 contains meta data (e.g., itag, RFtag, etc.) which provides a mapping between entries in the logical register (e.g., GPR1) and entries in physical register file 380 (e.g., physical register array entry). The RFtag is the pointer that correlates a logical register entry to a physical register file entry. For example, when an instruction wants to read a logical register, e.g., GPR1, the logical register mapper 350 tells issue queue 330, which tells execution unit 340 where in the physical register file 380 it can find the data, e.g., the physical register array entry.

Flush recovery to logical registers is performed through logical register mappers 350 typically by slice from history buffers, e.g., SRBs 370. Logical register entries are restored after a flush and/or recovery from the history buffer (SRB) 370 to the logical register mapper 350 that updates the RFtag pointers so instructions know where to get the correct data. During a flush operation, history buffer (SRB) entries to be recovered are read from the history buffer (SRB) and written to the logical register mapper 350. The logical register mappers 350 are typically partitioned into groups to cover the various types of logical registers, e.g., general purpose registers (GPR), floating point registers (FPR), vector/scalar registers (VSR), etc. For example, the logical register mappers 350 could be partitioned into three (3) groups, each group covering one of a GPR, FPR/lower VSR, and upper VSR logical register. For a logical register having ninety-six (96) entries and partitioned into three groups, each group of the logical register could have thirty-two (32) entries. Other divisions and groups of the logical register are contemplated.

Typically during recovery, only one logical register entry per cycle is recovered from the history buffer (SRB) per slice. Each logical register entry (LReg) recovered from the history buffer (SRB) typically requires the mapper to decode the LReg bit field transmitted by the SRB restore port in order to write the data into the correct logical register mapper entry. To write the data to the correct logical register mapper entry a multiplexor is used to select from all the recovery ports of the logical register mapper. In other words, typically one logical register per cycle would be restored from the history buffer (SRB) and sent to the logical register mapper, and the logical register mapper would look up which out of all the logical register mapper entries the restored logical register supplied from the history buffer (SRB) entry matches.

Flush recovery is a factor in processor performance. A flush recovery pipeline typically will have a warm-up period during which nothing is recovering while the flush is being processed. Typical flush processing involves during the first cycle after flush initiating (FL+0 cycle), latching the flush itag from the Instruction Fetch Unit. During the next cycle (FL+1 cycle), an itag compare is performed on every entry in the history buffer (SRB) to determine which history buffer (SRB) entries must be recovered and to set the recovery bit vector. More specifically, in an aspect, two itag compares are performed on each history buffer (SRB) entry. The evictor itag for the history buffer (SRB) entry is compared to the flush itag to determine if the evictor tag is younger, in which case the logical register entry (LReg) should be restored and a restore bit is set. In addition, the history buffer (SRB) entry itag is compared to the flush itag to determine whether the history buffer (SRB) entry itag is younger than or equal to the flush itag, in which case the logical register entry (LReg) is cleared. The itag compare sets a "restore required" vector per slice. Two itag compares are performed per entry and in a history buffer (SRB) with sixty-four (64) entries per slice, one hundred twenty-eight (128) itag compares are performed per slice.

During the next cycle in processing the flush recovery in the history buffer (SRB) (FL+2 cycle), the recovery bit vector will be read and the first entries will be found. In an example, the history buffer (SRB) will read: four (4) history buffer (SRB) entries mapped to the VSR (register), four (4) history buffer (SRB) entries mapped to the FPR (register), and four (4) history buffer (SRB) entries mapped to the GPR (register) per slice, for a total of twelve (12) restore entries out of a group of 64 entries in a slice. The history buffer (SRB) entries with the restore bit activated will be looked up (read). The LReg information included in the history buffer (SRB) entries is used to steer the history buffer (SRB) entries to recovery ports associated with, e.g., connected to, the proper logical register mapper. The LReg typically is a bit field that identifies the logical register entry.

In the next cycle (FL+3 cycles), the history buffer (SRB) entries to be recovered are read and latched. In an example, twelve (12) entries per slice are read out of the sixty-four (64) history buffer (SRB) entries, for a total of twenty-four (24) entries per super slice read out of the one hundred twenty-eight (128) entry history buffer (SRB). Twelve (12) history buffer (SRB) entries out of the twenty-four (24) are latched to the recovery ports (one history buffer (SRB) entry per recovery port).

These first four steps (FL–FL+3 cycles) after receiving the flush itag are just warm-up of the flush recovery pipeline in the history buffer (SRB). In these first four cycles, no data is sent from the history buffer (SRB) to the register mapper for recovery. At the next cycle (FL+4 cycle) history buffer (SRB) entries are sent to the register mappers. If there are twelve ports looking across a history buffer (SRB) superslice with 128 entries, it would take 11 additional cycles to recover every single entry in that history buffer (SRB) (128/12=10.66).

Disclosed is a technique, method, system, and/or processor for restoring logical registers to the state they were in before an exception, e.g., interruptible instruction. The time to recover the contents of logical registers compared to traditional designs is decreased by utilizing one or more disclosed techniques, methods, configurations, systems, architectures, circuitry, logic programming, and embodiments to decrease latency and increase the efficiency of a processor. In an embodiment, to recover entries from a history buffer, e.g., SRB, rather than process the flush, compare itags per history buffer (SRB) entry, and look up the entries to be recovered from the history buffer (SRB), instead entries are read from the history buffer (SRB) in order and history buffer (SRB) entry itags are compared with the flush itag after reading out the history buffer (SRB) entries. Instead of using the flush itag and valid broadcast to start the recovery pipeline, the history buffer (SRB) in an embodiment will always read out the history buffer (SRB) entries, and use the flush itag at the end of the pipeline to reduce flush latency and to reduce the number of itag comparisons. In an embodiment, the flush itag is processed at the end of the flush processing pipe rather than at the front of the flush recovery process.

In an aspect, the history buffer (SRB) will read entries out of the history buffer (SRB) and drive them to the recovery port latches. In an aspect there will be a pair of history buffer (SRB) entry itag comparisons per recovery port (itag and evictor itag) against a reference itag, e.g., a flush itag, to see if the logical register entry needs to be cleared (e.g., flushed) and/or recovered. This process, technique and configuration of the processor and the history buffer (SRB) will save expensive compare and lookup hardware. Instead of processing two compares per history buffer (SRB) entry (e.g., 256 compares for a 128 entry SRB), the disclosed technique uses two compares per port times 'n' threads per slice (24×n). For example, if there are twelve recovery ports per super slice then for a single thread there would be 24 itag compares per super slice (12 ports×2 itags per port), or if two threads, then (12 ports×2 itags×2 threads) 48 compares. The history buffer (SRB) flush processing and logical register recovery in an embodiment has simplified look up logic, and in an aspect involves reading entries out of the history buffer (SRB) round robin.

Figure 4:
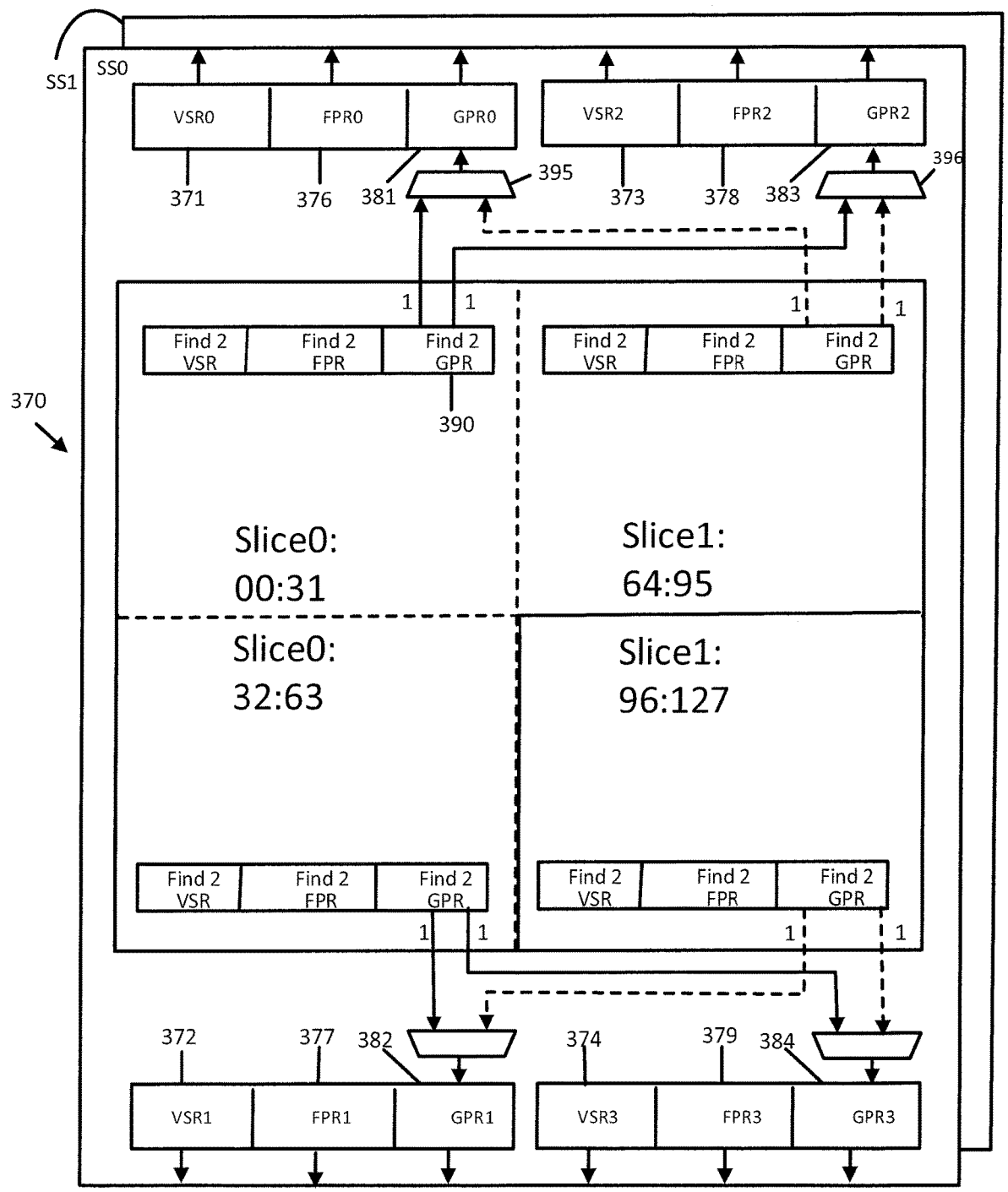
FIG. 4 illustrates a block diagram of a history buffer.

FIG. 4 illustrates a block diagram of an exemplary history buffer, e.g., SRB 370, according to an example in which aspects of the present disclosure may be practiced. SRB 370 stores itag information, LReg data identifying the logical register, and reg file tag (RFTag), and may also contain other metadata for each entry evicted from the logical register. The LReg data in an example is a bit field, e.g., a seven bit field that identifies the logical register associated with the data stored in the history buffer. In the example of FIG. 4, SRB 370 has 256 entries across four slices where SRB entries 0:63 are in slice 0, SRB entries 64:127 are in slice 1, SRB entries 128:191 are in slice 2; and SRB entries 192:255 are in slice 3. In the example of FIG. 4, portions of super slice 0 (SS0) are shown which includes slice 0 and 1. Super slice 1 (SS1) in an embodiment is the same as super slice 0 (SS0). Each slice has six (6) recovery ports for 64 SRB entries including two (2) recovery ports mapped to VSR, two (2) recovery ports mapped to FPR, and two (2) recovery ports mapped to GPR. In FIG. 4, super slice 0 of SRB 370 has four (4) VSR ports 371, 372, 373, and 374, four (4) FPR ports 376, 377, 378 and 379, and four (4) GPR recovery ports 381, 382, 383, and 384. It is contemplated that SRB 370 may have more or less entries, more or less slices, and more or less read/recovery ports per slice.

Flush processing in the SRB 370, in an embodiment, occurs speculatively, and in an aspect involves speculative look up processing. In SRB 370, the SRB entries in an embodiment are read out of the SRB, and in an aspect are read out circularly, e.g., sequentially in order in a loop. In an aspect, the entries in the SRB 370 are read out before a flush itag is received. In this manner, the SRB is speculatively read in cycle (FL−1), e.g., before a flush occurs. In the example of FIG. 4, slice 0 reads out 64 entries from SRB 370 and slice 1 reads out 64 entries from SRB 370, for a total of 128 entries read in super slice 0 (SS0). Both super slices SS0 and SS1 of the SRB 370 will read out 256 SRB entries.

When a flush operation needs to be processed, the entries in the SRB that have already been read out will be compared to a reference instruction itag, e.g, a flush itag, to see if the entry needs to be cleared and/or recovered. The history buffer (SRB) will read out the history buffer (SRB) entries and drive them to the recovery (restore) port latches. The reference itag in an embodiment identifies the instruction where the interrupt or exception, e.g., mispredicted branch, occurred, and, in an aspect, is the flush itag that is provided to the history buffer to initiate or trigger a flush recovery procedure and/or the flush itag provided for comparison purposes to determine which SRB entries need to be cleared and/or recovered. Prior to the recovery (restore) port, there will be one or more SRB entry itag compares to (e.g., against) the reference itag, e.g., the flush itag, to see if the SRB entry and/or logical register (LReg) needs to be cleared and/or recovered. The SRB entry itag in an embodiment will be compared to the flush itag to determine whether it is younger than or equal to the flush itag, and if so the logical register entry (LReg) will be cleared, e.g., flushed. In an alternative and/or additional embodiment, the evictor itag of the SRB entry will be compared to the flush tag to see if it is younger than the flush itag, and if so the logical register entry (LReg) will be restored. Performing the flush itag comparison at the end of the pipeline will reduce flush-latency and reduce the number of itag comparisons.

Figure 5:
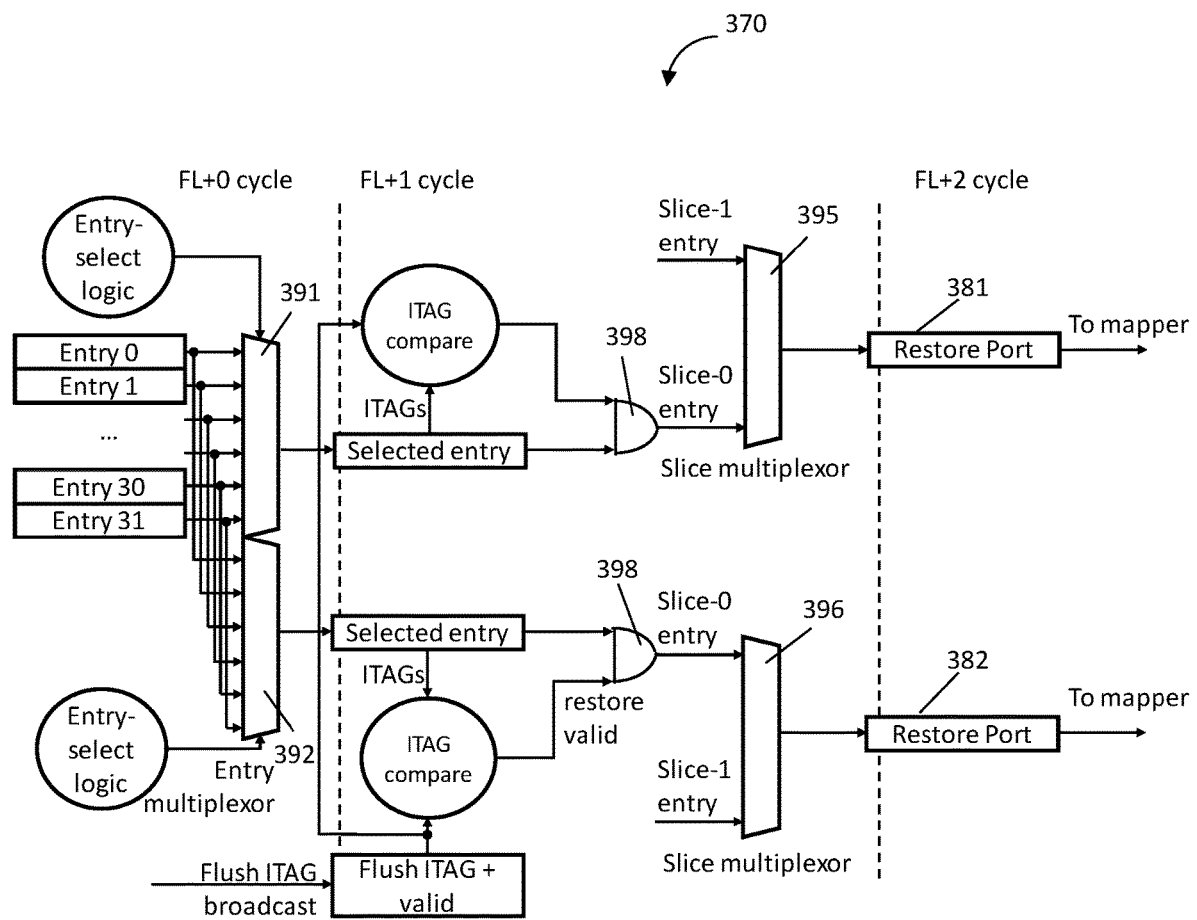
FIG. 5 illustrates a block diagram of a portion of a slice of the history buffer of FIG. 4 and a speculative recovery process according to an embodiment of the disclosure.

Turning to more specifics of the speculative processing, FIG. 5 illustrates a block diagram of a portion of the top-left quadrant, i.e., slice 0 (entries 0:31) of history buffer (SRB) 370 and how a speculative recovery process would proceed and drive SRB entries to restore ports 381 and 383 in FIG. 4, according to an embodiment of the disclosure. In FIG. 4, the Find 2 block 390 includes the lookup hardware including multiplexors 391 and 392 shown in FL+0 cycle in FIG. 5. In an embodiment, after the SRB entries have been read and the flush process has initiated, the entries read from the history buffer (SRB) are driven to the correct recovery (restore) ports in an embodiment using one or more, preferably a series, of multiplexors. In one or more embodiments, entry and slice multiplexors are used to drive the SRB entries to be restored to the recovery (restore) ports 381 and 383.

In an embodiment, the flush process is initiated and in an aspect the history buffer (SRB) receives a trigger signal, e.g., a flush itag, for the history buffer to start its recovery procedure. During cycle (FL+0), the first cycle after a flush procedure is initiated, and after the SRB entries have already been read out of the history buffer (SRB), the entries read out from the history buffer (SRB) are directed to an entry multiplexor. In the example of FIG. 4, and FIG. 5, the SRB entries read out of SRB 370 are directed to entry multiplexors from which an SRB entry is selected during cycle FL+0. More specifically, as shown in FIG. 5, the SRB entries read out of slice 0 from entries 0:31 are directed to entry multiplexors 391 and 392 during the first cycle after a flush is initiated and two SRB entries are selected, one from each multiplexor. As the restore ports in FIG. 5 are, for example, GPR ports 381 and 383, a GPR SRB entry would be selected (read) from entry multiplexor 391, and a GPR SRB entry would be selected (read) from entry multiplexor 392, so two GPR SRB entries would be selected (read) during cycle FL+0. In the example of FIGS. 4 and 5, there would be twelve (12) entry multiplexors per superslice (SS0), and twenty-four (24) multiplexors for both super slices SS0 and SS1. While not shown in FIG. 5, similar hardware would be configured and associated with the restore ports shown in FIG. 4 to find and select the respective SRB entries.

In the next cycle (FL+1), two cycles after the flush process initiated, in an embodiment an itag comparison is performed as illustrated in FIG. 5. In an example, the selected entries read out of the entry multiplexors are compared with the flush itag. In an embodiment, two itag comparisons are performed, namely a comparison between the itag of the selected history buffer (SRB) entry and the flush itag, and a comparison between the evictor itag of the selected history buffer (SRB) entry and the flush itag, to determine which SRB entries and/or logical entries (LRegs) need to be cleared and/or recovered. The comparisons, and in particular the itag comparisons, are discussed in more detail below in connection with FIG. 6. In an example, two itag compares are performed per history buffer (SRB) entry, per port, per thread, so with twelve (12) ports per superslice, and two itag compares per port, 24 itag comparisons are performed for a single thread in a superslice, and 48 comparisons are performed if there are two threads per superslice. In an embodiment the comparisons, e.g., the itag comparisons, are performed at, in proximity of, and/or in association with the history buffer (SRB) recovery ports, and in an embodiment, in connection with the specific recovery (restore) ports to which the history buffer (SRB) entry is directed, e.g., restore ports 381 and 383 in FIGS. 4 and 5.

If an entry selected (read) by the entry multiplexor and which undergoes an itag comparison in cycle (FL+1) is to be restored, the valid restore bit is set at AND gate 398 and the SRB entry proceeds to slice multiplexors 395 or 396. During FL+1 cycle, two SRB entries from slice 0 entries (0:31) can be driven to slice multiplexors 395 and 396, one to each multiplexor. In FIG. 5, two GPR history buffer (SRB) entries can be latched at the recovery (restore) ports 381 and 383. In FIG. 4, twelve (12) history buffer (SRB) entries are latched at the recovery ports across the super slice. In the next cycle (FL+2), the recovered history buffer (SRB) entries are sent to the register mapper in the logical register. In FIG. 5, the GPR SRB entries latched at the recovery (restore) ports 381 and 382 would be sent the GPR mapper in the logical register.

In one embodiment, the number of recovery ports between the history buffer and the register mappers is increased to increase recovery bandwidth and to reduce recovery latency. For example, the history buffer, (SRB), in an embodiment, such as, for example, FIG. 4, has 12 recovery ports for two slices accessing 128 entries, and 24 recovery ports for four slices accessing 256 entries. In the example of FIG. 4, there may be twenty-four (24) entry multiplexors per superslice, and twelve (12) slice multiplexors per super slice. In an aspect, the output of two entry multiplexors are connected as the input to each slice multiplexor. The number of entry multiplexors and slice multiplexors will vary depending upon the number of history buffer (SRB) recover ports.

Figure 6:
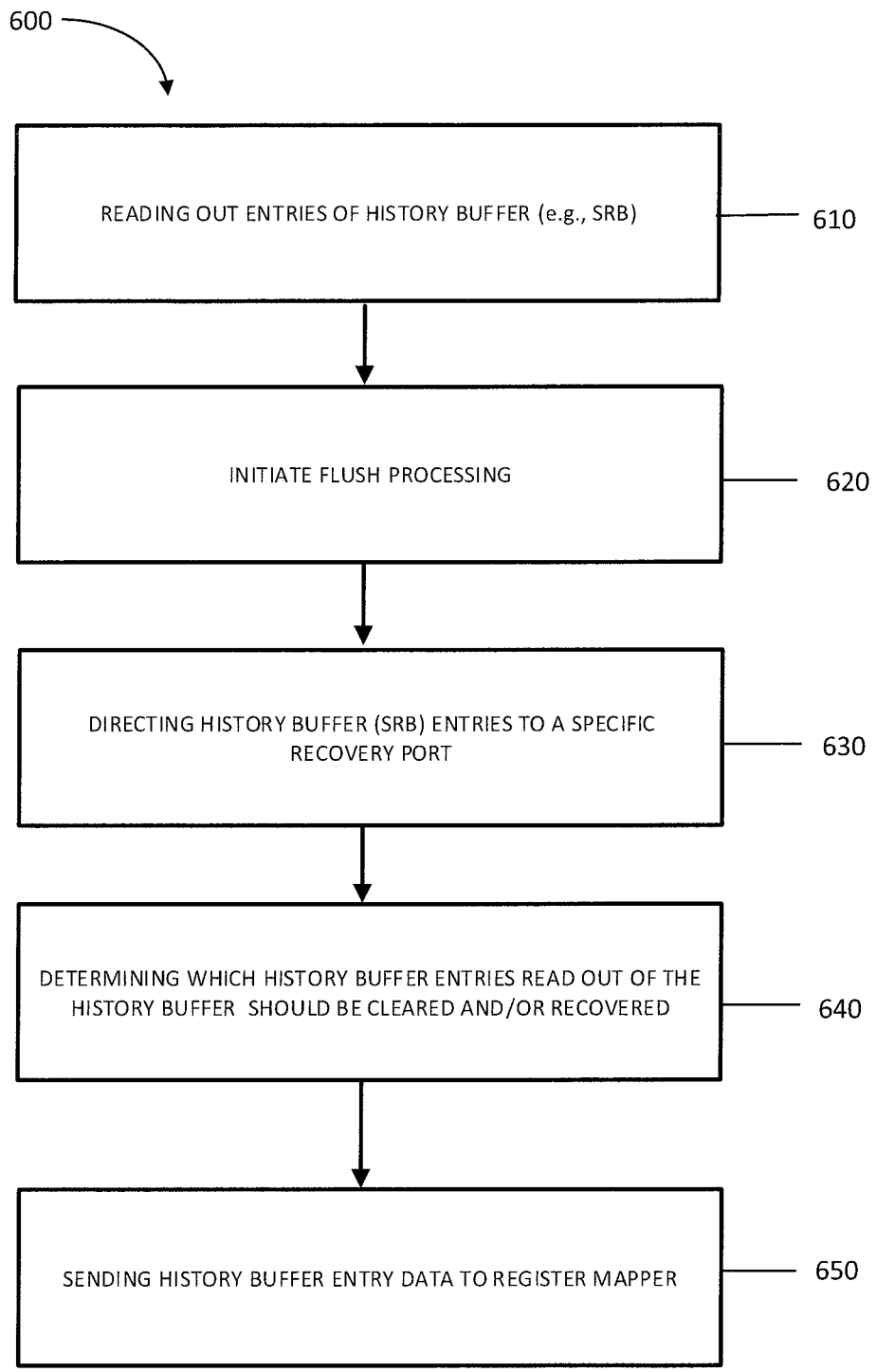
FIG. 6 illustrates a flow chart of a method of restoring a logical register according to an embodiment.

FIG. 6 is an exemplary flowchart in accordance with one embodiment illustrating and describing a method of handling instructions in an information handling system, and more specifically a method of processing data in a processor in for example a computer system that decreases the time to recover the state of logical registers after a flush operation, in accordance with an embodiment of the present disclosure. While the method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, simultaneously, or the steps may be performed in the order disclosed or in an alternate order.

A method 600 of handling instructions in a processor is illustrated in FIG. 6, and more specifically a method of decreasing the time to recover logical registers from a history buffer, e.g., a SRB. At 610, entries in the history buffer, e.g., SRB, are read out of the history buffer. In an embodiment, the entries are read out of the history buffer in sequence in a circular manner, and in an aspect are read out before history buffer flush processing is initiated. That is, in an embodiment the entries in the history buffer are continually read out of the history buffer during operation of, or during portions of operation, or certain operations of, the processor. In this manner, the entries in the history buffer (SRB) are read out before receipt of a flush itag and/or a signal triggering flush-recovery processing of the history buffer and/or logical registers.

At 620, flush processing is initialized. That is, for example, the processor has an exception or an interruptible instruction, e.g., a branch mispredict, and entries in the logical register in the processor need to be flushed and/or recovered. In this example, to flush and/or recover the processor state to the condition that existed prior to the exception, flush processing is initiated. In an aspect, a signal can initiate flush-recovery processing. In an embodiment, a flush itag is sent to the history buffer (SRB) to initiate flush processing, to identify the instruction for comparison purposes, and/or to identify the instructions that need to be flushed and/or recovered.

The history buffer (SRB) entries that were read from the history buffer in an embodiment at 630 are processed and directed to the proper history buffer recovery ports. In this regard, the history buffer (SRB) ports are typically mapped to a particular register, such as, for example, to the vector-scaler register (VSR), the Floating Point Register (FPR), and/or the General Purpose Register (GPR), as shown, for example, in FIG. 4. Other registers are contemplated for the processor pipeline. In an embodiment, a series of multiplexors are used to direct the history buffer (SRB) entries read from the history buffer (SRB) to the one or more history buffer (SRB) recovery ports. In this regard, in an example, entry multiplexors are used to direct the history buffer (SRB) entries read from the history buffer (SRB) to the correct recovery port that is mapped to the proper logical register mapper for that history buffer (SRB) entry. In this regard, the LReg information stored in the history buffer (SRB) entry can be used to steer the history buffer (SRB) entry to the proper history buffer recovery port connected to the correct logical register mapper. In an aspect, the entries read from the history buffer (SRB) are directed to look-up hardware that includes an entry multiplexor, e.g., entry multiplexors 391 and 392. In an example, two SRB entries corresponding to each of the different types of registers, e.g., two GPR entries, two FPR entries, two VSR entries, are separately looked up and selected for further processing in connection with a specific recovery (restore) port.

At 640 it is determined which history buffer (SRB) entries read out from the history buffer (SRB) should be cleared and/or recovered. In an embodiment, before the history buffer (SRB) entry is sent to the recovery port, one or more itag comparisons are performed to determine whether the history buffer (SRB) entry and/or logical register entry (LReg) should be cleared and/or restored. In this regard, the one or more comparisons are preferably itag comparisons and the one or more comparisons are performed after the entry is read out of the history buffer, and after the look up hardware, e.g., entry multiplexor, selects the different types of SRB entries. In an embodiment, two comparisons are performed on information within the history buffer (SRB) entry after the entries are read out of the history buffer (SRB) and before the entries are driven and/or released to one or more recovery ports in the history buffer (SRB). In an aspect, one comparison includes comparing the history buffer (SRB) entry itag to a reference itag, e.g., the flush itag, to determine whether the history buffer (SRB) entry and/or corresponding logical register entry (LReg) should be cleared. Alternatively and/or in addition, in an aspect, another comparison includes comparing the flush itag to the itag of the instruction that evicted the history buffer entry (evictor itag) to determine whether the history buffer (SRB) entry and/or corresponding logical register entry (LReg) should be restored. In an embodiment, the itag comparisons are performed at, in proximity of, in association with, and/or just prior to the recovery ports. In an embodiment, there are two itag comparisons performed per recovery port. Where there are 12 recovery ports per super slice of the history buffer, 24 itags comparison in an embodiment are performed per super slice per cycle.

After the itag comparisons, the SRB entries to be read out (restored) are driven to slice multiplexors where the slice of the history buffer (SRB) selects the entries to be read out of the slice multiplexor and driven to the recovery (restore) ports. The history buffer (SRB) entry data to be restored in an embodiment at 650 is released to the history buffer recovery ports and is thereafter sent to and/or received by the logical register mapper of the logical register. In an embodiment, where the logical register entry (LReg) is to be cleared as part of the flush process, an appropriate signal may be sent to the history buffer (SRB) recovery port, and that signal may be read by the logical register mapper to clear the logical register entry (LReg). Other methods of clearing the logical registry entry (LReg) are contemplated.

The above described method provides a reduced-area flush recovery implementation process for a history buffer, e.g., Save & Restore Buffer (SRB), wherein recovery detection is performed at the history buffer read ports, rather than having a per history buffer (SRB) entry detection, to reduce hardware complexity and reduce latency, and increase processor efficiency and save power. In an embodiment, all flushes will take the same amount of time, and in an aspect history buffer (SRB) entries that will not be flushed will be read out of the history buffer (SRB). In a further aspect, the flush-recovery process may need to be restarted (flush recovery is re-initiated) if a new flush itag arrives for the same thread before having read through every history buffer (SRB) entry during the initial flush recovery process.

While the illustrative embodiments described above are preferably implemented in hardware, such as in units and circuitry of a processor, various aspects of the illustrative embodiments may be implemented in software as well. For example, it will be understood that each block of the flowchart illustration in FIG. 6, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks, or by computer instructions.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems that perform the specified functions or steps, by combinations of special purpose hardware and computer instructions, or computer instructions.

In an embodiment a computer system for processing information is disclosed where the computer system includes at least one processor for processing instructions, a logical register for storing data associated with the instructions, the logical register having one or more mappers, a history buffer associated with the logical register and for storing information evicted by a younger instruction and one or more computer readable non-transitory storage media. The computer system in an aspect includes programming instructions stored on the one or more computer readable non-transitory storage media for execution by the at least one processor, the programming instructions comprising (a) programming instructions to read out entries from the history buffer before a flush recovery process is initiated, (b) programming instructions to initiate the flush recovery process, (c) programming instructions to determine what entries in the history buffer should be at least one of flushed and recovered, and (d) programming instructions to send data from the history buffer to the one or more logical registers to flush or restore the logical registers.

The computer system in an embodiment further comprises programing instructions to compare evictor itags of the history buffer entries to the flush itag and in response to the evictor itag being younger than or equal to the flush itag, the history buffer sends the information associated with the history buffer entry to the history buffer recovery port. In a further embodiment, the computer system comprises programming instructions to compare history buffer entry itags to the flush itag, and in response to the history buffer entry itag being younger than the flush itag, clearing the logical register entry corresponding to the history buffer entry.

The circuitry, blocks, units, and programing described herein are identified based upon the application for which they are implemented in a specific embodiment of the invention. However, it should be appreciated that any particular nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, circuitry, chip, code, or portions thereof, which comprises one or more executable instructions or circuitry for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, combinations of special purpose hardware and computer instructions, or computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of processing data in a processor, comprising:
reading out a plurality of entries in a history buffer prior to initiating a first flush recovery process, wherein the history buffer has one or more history buffer recovery ports;
initiating the first flush recovery process for a thread;
determining which of the plurality of history buffer entries read out of the history buffer should be recovered;
using one or more bits in a bit field to steer each history buffer entry to be recovered to a correct history buffer recovery port, wherein the bit field identifies a logical register that each history buffer entry corresponds to;
sending information associated with each history buffer entry to be recovered to the correct history buffer recovery port; and
restarting reading out the plurality of entries in the history buffer if a second flush recovery process is initiated for the thread before reading out all the plurality of entries in the history buffer prior to initiating the first flush recovery process.

2. The method according to claim 1, wherein the plurality of entries in the history buffer are continually read out in response to the processor processing data.

3. The method according to claim 1, wherein determining which of the plurality of history buffer entries should be recovered includes comparing a plurality of instruction identifiers (itags) associated with the plurality of history buffer entries read out of the history buffer to a reference itag to determine which of the plurality of history buffer entries should be recovered.

4. The method according to claim 3, wherein the comparing is performed before each history buffer entry to be recovered is sent to the correct history buffer recovery ports after the history buffer entries are read out of the history buffer, and after the first flush recovery process is initiated.

5. The method according to claim 4, comprising comparing each history buffer evictor itag associated with each of the plurality of history buffer entries read from the history buffer to a flush itag to determine whether that evictor itag is younger, and in response to that evictor itag being younger than the flush itag, sending information associated with the history buffer entry including that evictor itag to one of the one or more history buffer recovery ports.

6. The method according to claim 1, further comprising directing the plurality of history buffer entries read out from the history buffer to a specific history buffer recovery port associated with a logical register.

7. The method according to claim 6, wherein each recovery port of the history buffer is associated with a mapper of a specific logical register.

8. The method according to claim 6, wherein one or more multiplexors are used to direct the plurality of history buffer entries read out from the history buffer to the specific history buffer recovery port.

9. The method according to claim 8, wherein the one or more multiplexors include an entry multiplexor and a slice multiplexor to direct the plurality of history buffer entries read out from the history buffer to the specific history buffer recovery port.

10. The method according to claim 1, comprising comparing a history buffer entry instruction identifier (history buffer entry itag) to a flush itag to determine whether the history buffer entry itag is younger than or equal to the flush itag, and in response to the history buffer entry itag being younger than or equal to the flush itag, clearing a corresponding logical register entry.

11. A computer system for processing data, the computer system comprising:
at least one computer processor for processing instructions, the at least one processor comprising:
a physical register file having a plurality of entries to store the data;
a logical register mapper configured to map each of a plurality of logical registers to one of the plurality of entries in the physical register file; and
a history buffer associated with the logical register mapper and having a plurality of recovery ports and a plurality of history buffer entries, each history buffer entry for storing information on a logical register evicted from the logical register mapper, wherein the information includes a bit field to identify an evicted logical register corresponding to that history buffer entry and an evicted instruction identifier (evictor itag) of an instruction that evicted the evicted logical register from the logical register mapper,
wherein the at least one processor is configured to initiate a flush-recovery process that includes sending a flush instruction identifier (flush itag) to the history buffer; and
wherein the history buffer has 256 entries, twenty-four recovery ports, and four slices, with 64 entries and 6 history buffer recovery ports per slice and is configured to: (a) read out the plurality of history buffer entries prior to receiving the flush itag; (b) determine which of the plurality of history buffer entries read out of the history buffer should be recovered; (c) for each history buffer entry to be recovered, use bits in the bit field of that history buffer entry to steer that history buffer entry to a specific history buffer recovery port; and (d) for each history buffer entry to be recovered, send information associated with that history buffer entry to be recovered to the specific history buffer recovery port.

12. The computer system of claim 11, wherein the history buffer is configured to compare each evictor itag of each of the plurality of history buffer entries to the flush itag and in response to a first evictor itag being younger than or equal to the flush itag, the history buffer entry having the first evictor itag is a specific history buffer entry to be recovered, and wherein the history buffer is configured to send the information associated with the specific history buffer entry to be recovered, including the first evictor itag, to the specific history buffer recovery port.

13. The computer system of claim 12, wherein the at least one processor is further configured to perform the itag comparisons after the plurality of history buffer entries are read out, after the flush recovery is initiated, and before each history buffer entry to be recovered is sent to the specific history buffer recovery port.

14. The computer system of claim 11, wherein the history buffer is configured to compare each of a plurality of history buffer entry instruction identifiers (history buffer entry itags) of the plurality of history buffer entries to the flush instruction identifier (flush itag), and the at least one processor is configured to clear each history buffer entry having a history buffer entry itag that is younger than the flush itag.

15. The computer system of claim 11, wherein the at least one processor is configured to continually read out history buffer entries from the history buffer in response to the at least one processor processing instructions.

16. A computer system of claim 11, wherein the at least one processor is further configured to direct history buffer entries read out from the history buffer to a specific history buffer recovery port associated with a specific logical register.

17. The computer system of claim 16, wherein one or more multiplexors are used to direct history buffer entries to the specific history buffer recovery port associated with the specific logical register.

* * * * *